Nov. 22, 1927.
W. HARTMANN
1,650,272
MOTOR VEHICLE
Filed Jan. 12, 1927
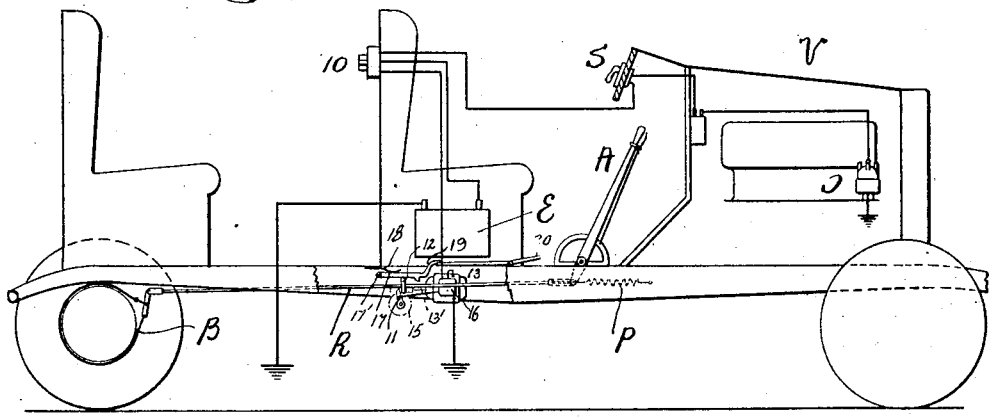
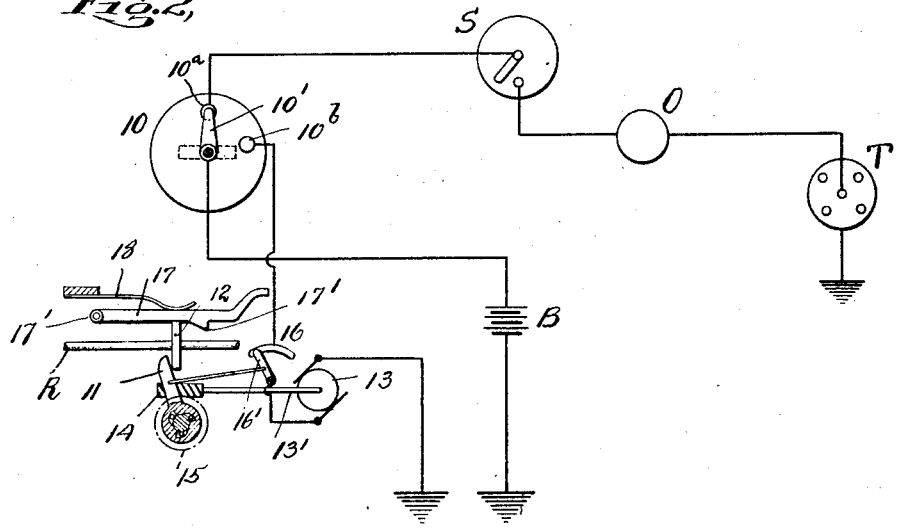
INVENTOR.
Werner Hartmann
BY
Max W. Ordmann
ATTORNEYS.

Patented Nov. 22, 1927.

1,650,272

UNITED STATES PATENT OFFICE.

WERNER HARTMANN, OF MOUNT VERNON, NEW YORK.

MOTOR VEHICLE.

Application filed January 12, 1927. Serial No. 160,727.

This invention relates to motor vehicles and has for its object to provide an emergency device to be controlled from the rear compartment of the vehicle so as to enable the occupant thereof, in case of emergency, to shut off the motor and bring the vehicle to a stop. Such emergencies arise, for example, when the driver suddenly loses control of the wheel or in case of threatening danger of accident.

Another object of my invention is to so construct the emergency device that it can easily be manipulated and which can be conveniently concealed in the rear compartment.

With this and other objects in view, my invention consists in the novel construction, combination and arrangement of parts as will be hereinafter more fully described and defined in the appended claims.

In the accompanying drawing in which similar reference characters denote corresponding parts, Fig. 1 is a diagrammatic side elevation of an automobile equipped with my new device; and Fig. 2 a diagram of the device and the electric connections.

Referring specifically to the drawing, V denotes a motor vehicle of any conventional type, S the usual electric ignition control switch, I the ignition system, A the brake actuating means, E the battery and B the brake band for one of the rear wheels.

According to my invention an electric emergency switch 10 is included in the ignition circuit controlled by the main ignition switch S, so that the motor can be started and stopped only when both, the main switches S, and the emergency switch 10 are closed and opened respectively. When any one of these switches is moved to open position the ignition circuit will be broken and the motor will stop.

The emergency switch 10 is suitably concealed in the rear compartment so that its location will be unknown to a stranger. Since this switch is to be used only in emergency cases, it will normally be in closed position, and therefore not interfere with the control of the vehicle by the driver. In addition to this emergency switch the device may also comprise means for automatically applying the brake so as to bring the vehicle to a full stop after breaking the ignition circuit. One embodiment of such means illustrated in the drawing, comprises a finger 11 which is capable of engaging a shoulder 12 on the brake actuating rod R and to move the latter so as to tighten the brake when on opening the ignition circuit it is swung in a certain direction. The operation of the finger may be effected through an electric motor 13 operated through a second circuit of the same electric battery B operating the ignition system I. To this end the switch arm $10^1$ of the emergency switch 10 when moved from the contact point $10^a$ to the contact point $10^b$ will open the ignition circuit and close the second circuit operating the motor 13. The spindle $13^1$ of the motor is formed with a worm 14 which meshes with a worm gear 15 with whose axle the finger 11 is suitably coupled so that the latter when the gear 15 is driven will swing to operate the brake and when the gear 15 stops will be allowed to swing back into initial position. The auxiliary circuit running through the motor 13 has an automatic switch 16 whose arm $16^1$ is operatively connected to the finger 11 so that when the finger 11 is moved to tighten the brake B it will displace the switch arm $16^1$ to open the circuit through the motor 13. As a result thereof the finger 11 will be allowed under the action of the brake spring not shown to return to initial position.

To enable the locking of the brake in operative position when the vehicle is on an uphill or downhill grade, I provide a lock lever 17 fulcrumed at $17^1$ in the chassis and which extends longitudinally of and in proximity to the brake actuating rod R. The locking lever is actuated by a spring 18 and is provided with a catch $17^1$ which will engage the shoulder 12 of the brake actuating rod R when the latter is moved by the finger 11 to operate the brake. When the shoulder 12 is caught by the catch $17^1$ it locks the brake band in operative position. The free end of the lever 17 may be engaged by a bar 19 to be operated by means of a pedal 20 from the driver's compartment so that when it is desired to release the brake the locking lever 17 can be raised to free the shoulder 12 of the rod. When the rod R under the action of brake spring moves back into the brake releasing position, its shoulder will swing the finger 11 on its axis into initial position.

In the diagram shown in Fig. 2 the ignition circuit runs from the battery B through the emergency switch 10, the main ignition switch S, the spark coil O to the distributor T then back to the battery B. The second circuit runs from the battery B through the emergency switch 10, to the automatic switch 16, through the motor 13 and thence back to the battery.

Since various modifications may be made in the construction of the device without departing from the principle of my invention I do not wish to restrict myself to the details described and shown.

What I claim is:—

1. In a motor vehicle, the combination with an electric source and the main switch in front of the driver's seat for controlling the electric ignition circuit, of an emergency device in the rear compartment of the vehicle to be controlled by the occupant of said compartment, said device including an auxiliary switch for said ignition circuit and automatically controlled means actuated from the same electric source on the opening of the ignition circuit through said auxiliary switch for bringing the vehicle to a stop.

2. In a motor vehicle, the combination with an electric source, the main switch in front of the driver's seat for controlling the electric ignition circuit and the brake mechanism, of an emergency electric control device in the rear compartment of the vericle to be controlled by the occupant thereof and including an auxiliary switch for controlling said circuit and automatically controlled means actuated from the same electric source operatively connected to said brake mechanism and adapted to be operated after the ignition circuit is opened through said auxiliary switch.

3. In a motor vehicle, the combination with na electric source, the main switch for controlling the electric ignition circuit and the brake mechanism, of an emergency device in the rear compartment of the vehicle to be controlled by the occupant of said compartment comprising an auxiliary switch for controlling said circuit, and means for automatically operating said brake mechanism after the ignition circuit is opened, said means including a motor driven from said electric source, a member impelled from said motor and capable of actuating said brake mechanism and an automatic switch controlled by said member to stop said motor after the brake has been applied.

4. In a motor vehicle, the combination with an electric source, the main switch for controlling the electric ignition circuit and the brake mechanism, of an emergency device in the rear compartment of the vehicle to be controlled by the occupant of said compartment comprising an auxiliary switch for controlling said circuit, and means for automatically operating said brake mechanism after the ignition circuit is opened, said means including a motor driven from said electric source, a member impelled from said motor and capable of actuating said brake mechanism, an automatic switch controlled by said member to stop said motor after the brake has been applied and automatic means for locking said brake in operative position after said motor has stopped.

5. In a motor vehicle, the combination with an electric source, the main switch for controlling the electric ignition circuit and the brake mechanism, of an emergency device in the rear compartment of the vehicle to be controlled by the occupant of said compartment comprising an auxiliary switch for controlling said circuit, and means for automatically operating said brake mechanism after the ignition circuit is opened, said means including a motor driven from said electric source, a member impelled from said motor and capable of actuating said brake mechanism, an automatic switch controlled by said member to stop said motor after the brake has been applied, automatic means for locking said brake in operative position after said motor has stopped and means for releasing said locking means from driver's compartment.

In testimony whereof I affix my signature.

WERNER HARTMANN.